United States Patent [19]

Hunziker

[11] Patent Number: 5,284,125
[45] Date of Patent: Feb. 8, 1994

[54] MULTI-PURPOSE FIREPLACE FOR OUTDOOR USE

[76] Inventor: Werner Hunziker, Mattenweg 8,, CH-5040 Schöftland, Switzerland

[21] Appl. No.: 828,877
[22] PCT Filed: May 28, 1991
[86] PCT No.: PCT/CH91/00124
  § 371 Date: Jan. 31, 1992
  § 102(e) Date: Jan. 31, 1992
[87] PCT Pub. No.: WO91/19448
  PCT Pub. Date: Dec. 26, 1991

[30] Foreign Application Priority Data
  Jun. 18, 1990 [CH] Switzerland ............... 2019/90-5

[51] Int. Cl.⁵ .............................................. A47J 37/00
[52] U.S. Cl. ............................ 126/25 R; 126/1 D; 126/8
[58] Field of Search ............... 126/1 D, 25 R, 506, 126/8, 9 R, 9 B, 12, 13, 1 E; 99/447, 449, 450

[56] References Cited

U.S. PATENT DOCUMENTS

| | | | |
|---|---|---|---|
| 160,542 | 3/1875 | Old | 126/8 |
| 702,999 | 6/1902 | Richards | 126/506 |
| 733,129 | 7/1903 | Berry | 126/1 D |
| 1,100,890 | 6/1914 | Jones | 126/1 D |
| 2,350,948 | 6/1944 | Walker | 126/25 R |
| 3,548,803 | 12/1970 | Vogel | 126/25 |
| 3,568,590 | 3/1971 | Grice | |
| 4,700,618 | 10/1987 | Cox, Jr. | 126/25 R |
| 4,829,977 | 5/1989 | Valentine | |

FOREIGN PATENT DOCUMENTS

| | | | |
|---|---|---|---|
| 1810895 | 6/1970 | Fed. Rep. of Germany | 126/8 |
| 3618651 | 12/1987 | Fed. Rep. of Germany | |
| 3824413 | 1/1990 | Fed. Rep. of Germany | |
| 2562213 | 10/1985 | France | |
| 84024 | 6/1920 | Switzerland | |

*Primary Examiner*—James C. Yeung
*Attorney, Agent, or Firm*—Speckman, Pauley & Fejer

[57] ABSTRACT

A multi-purpose fireplace for outdoor use having a firebox, a baking chamber and at least one grill above the baking chamber. The baking chamber is delimited by a metal wall with a door which is accessible from the outside of the fireplace. The baking chamber is fixed in an outer housing which receives the firebox. The baking chamber is preferably also delimited by a cylindrical metal barrel which is mounted with respect to the sidewalls such that an open flue conduit is formed between the metal barrel and the outer housing.

13 Claims, 3 Drawing Sheets

MULTI-PURPOSE FIREPLACE FOR OUTDOOR USE

BACKGROUND OF THE INVENTION

1. Field of the Invention

This invention relates to a multi-purpose fireplace, for outdoor use, having a firebox, a baking chamber and above the backing chamber at least one grill.

2. Description of Prior Art

A conventional multi-purpose fireplace for outdoor use is known from German Patent Disclosure DE-A1-3,618,651. This known multi-purpose fireplace is portable. The housing rests on support legs. The support legs are unsuitable for placing the multi-purpose fireplace on soft ground. A baking chamber, sheathed with fireproof and heat-insulating material, in particular with firebrick, is positioned in the lower part of the housing. The baking chamber is simultaneously used as the hearth, at least for the baking chamber. Positioned above the baking chamber is a chimney, made of metal walls extending in the shape of a truncated pyramid, the interior of which is intended to receive a conventional grill, and a smoke chamber with an air exhaust. There is a closable opening between the baking chamber and the chimney and the closable opening connects the smoke chamber with the hearth positioned inside the baking chamber. For grilling, it is necessary to provide a fire grill with burning coals above the ceiling of the baking chamber. The hearth in the baking chamber is not sufficient for grilling. Two hearths are required with this multi-purpose fireplace in order to satisfy the conditions set by the different purposes of the fireplace. Prior to baking, the glowing coals must be removed from the baking chamber, which is a dangerous and unpleasant task. The baking chamber of this multi-purpose fireplace requires 1.5 to 2 hours to attain baking temperature. Prior to a repeat of the baking operation, the baking chamber must again be filled with fuel and heated. Furthermore, expensive hardwood, such as beechwood, is used for heating the baking chamber. During the warm-up time and during baking this multi-purpose fireplace cannot provide warmth for a possible seat. Also, the multi-purpose fireplace is comparatively expensive. Simultaneous baking and smoking is not provided. Continuous baking operation is not possible. Furthermore, two comparatively expensive fuels, such as hardwood and charcoal, must be used.

SUMMARY OF THE INVENTION

It is one object of this invention to develop a simple and cost-efficient multi-purpose fireplace, which permits simultaneous and continuous operation of all functions present, such as baking, cooking, roasting and grilling, and which also additionally can be used to warm a seat positioned in front of the fireplace.

This object is achieved with a baking chamber that is delimited by a metal wall with a door accessible from the outside and is fixed in an outer housing receiving the firebox, leaving open flue conduits between the metal wall and the housing directly above the hearth. The multi-purpose fireplace according to this invention has only a single hearth separated from the baking chamber, which can be fired without interruption. Because the baking chamber is not surrounded by heat-insulating material, but by a metal wall, the warm-up time is reduced to approximately 15 to 20 minutes for the ideal baking temperature, and the baking process can be repeated without interruption. The temperature in the baking chamber and also on the grilling, roasting and cooking level located above the baking chamber can be regulated with a smaller or larger fire or by opening or closing the baking chamber. Cost-efficient types of soft wood are suitable for heating, during baking, grilling, and roasting and while cooking, the fire can also warm a seat by way of the fireplace opening.

Advantageously, the outer housing comprises at least four interlocking sidewalls. The prefabricated sidewalls are advantageously fitted together in an interlocking manner. Making expensive connecting devices unnecessary. Two opposed sidewalls of the housing may be in the shape of a T and the two other opposed sidewalls in the shape of an inverted T, the two arms of the T each having a length corresponding to the wall thickness and at least one oblique surface keeping the sidewalls together. This embodiment of the sidewalls permits a simple assembly of the housing.

Above the baking chamber, the housing can receive horizontal crossbars which can be used for grilling, roasting and/or cooking purposes, and which can be covered by at least one cover, leaving free at least one flue conduit. The crossbars make possible the placement of a grilling grate or of a utensil for roasting or cooking. It is possible to place a plurality of removable and fire-resistant cover plates on crossbars extending along two oppositely positioned sidewalls of the housing, leaving free at least one flue conduit. The grilling, roasting and/or cooking surfaces can be adapted to the respective requirements by the placement or removal of fire-resistant cover plates.

The housing is advantageously placed on a base plate. Having a base plate, the fireplace can also be placed on a comparatively soft surface.

The housing can be covered by means of a chimney in the shape of a truncated pyramid, which is hingedly fastened to the housing. The chimney is particularly advantageous if the baking chamber is exclusively used.

Advantageously, the housing is constructed of high-density concrete. The sidewalls and also the base plate can be easily constructed of high-density concrete.

The housing can be sheathed around the hearth with concrete plates of limited fire resistance which do not retain heat. By this measure, the housing is effectively protected around the hearth with exchangeable concrete plates and the temperature adjustment is variable, Thus, the baking chamber rapidly reacts to temperature changes of the hearth.

In an advantageous manner, the baking chamber is delimited by a cylindrical metal barrel fastened to at least one of the sidewalls of the housing and closable from the outside by a door. This measure also provides an economical use for a used metal barrel. Often metal barrels or metal drums are thrown away after use, and this measure provides the opportunity of re-using the metal barrels. The metal barrel can be equipped with a horizontal, insertable sheet metal piece intended for receiving goods to be baked. On one hand, the insertable sheet metal piece provides a horizontal baking within the round metal barrel and, on the other hand, it keeps the goods to be baked at a distance from the heated lower surface of the metal barrel, which is directly and thus possibly unevenly heated.

BRIEF DESCRIPTION OF THE DRAWINGS

An exemplary embodiment of this invention is described in detail below, making reference to the drawings. Wherein.

DETAILED DESCRIPTION OF PREFERRED EMBODIMENTS

Figure 1:
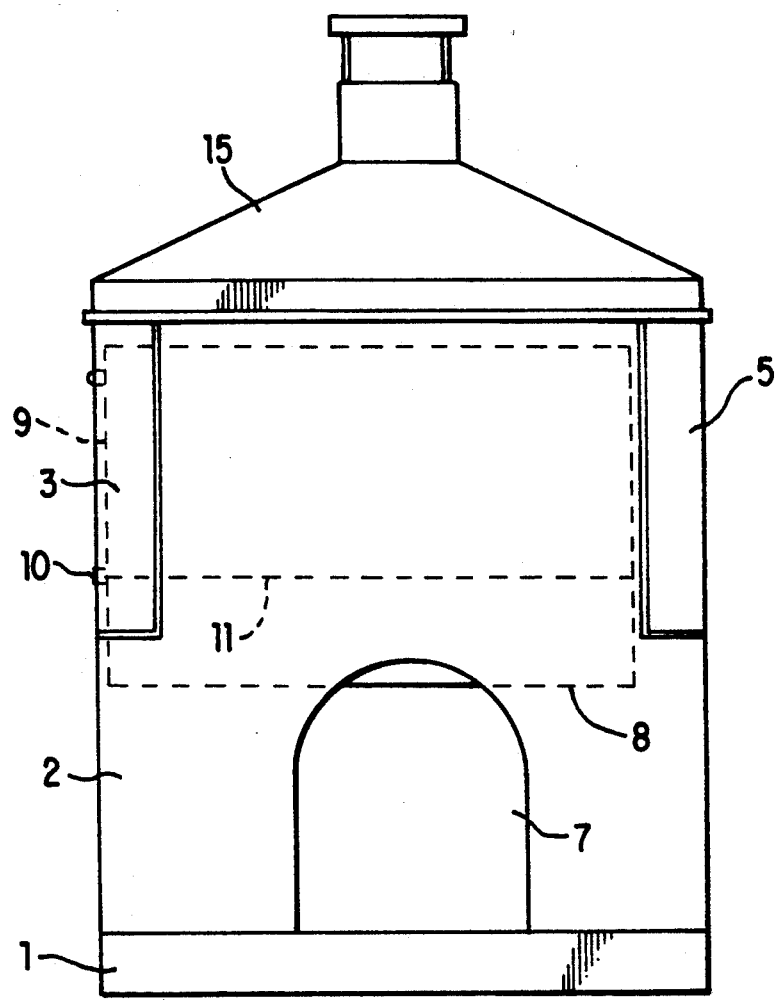
FIG. 1 is a front view of a multi-purpose fireplace according to one preferred embodiment of this invention.
Figure 2:
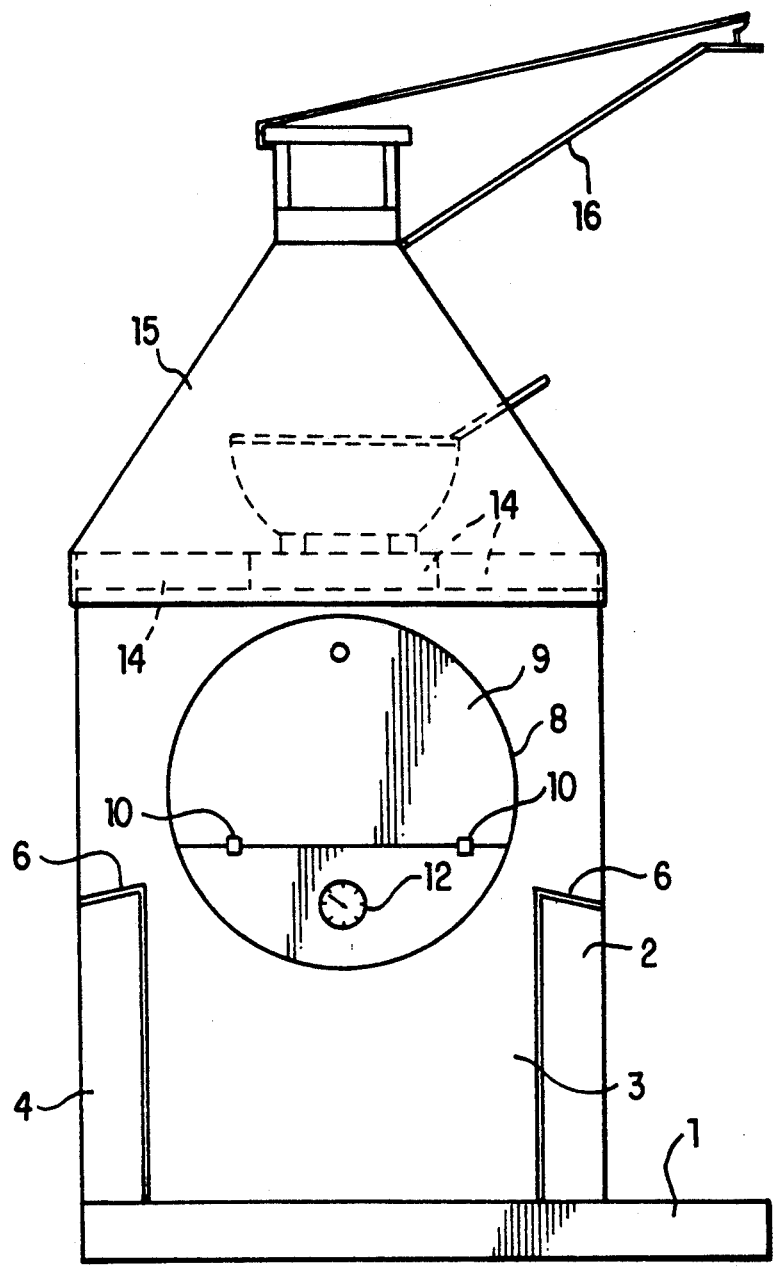
FIG. 2 is a view of the multi-purpose fireplace shown in FIG. 1.
Figure 3:
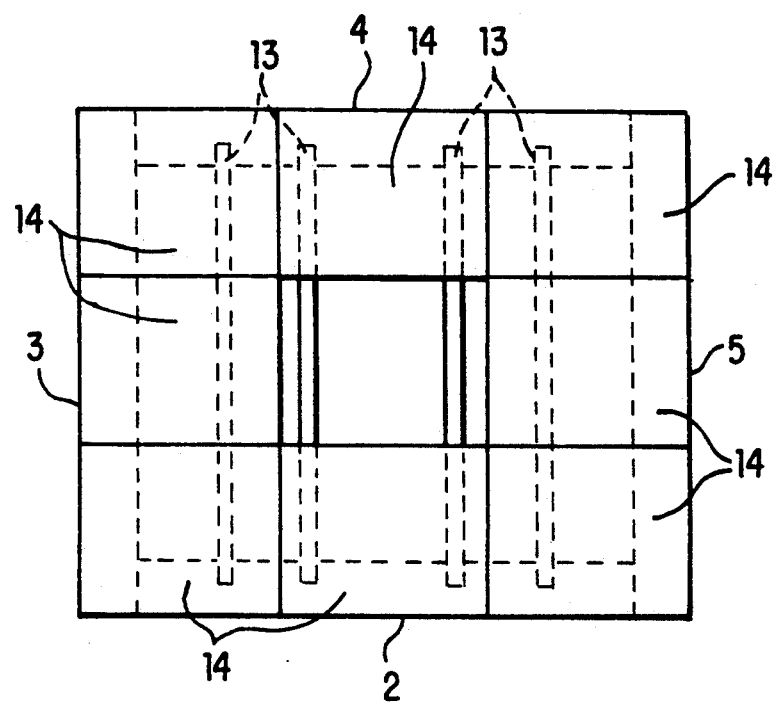
FIG. 3 is a top view of the housing of the multi-purpose fireplace, with the chimney removed.

A multi-purpose fireplace seen in a front view is illustrated in FIG. 1. The fireplace has a base plate 1. Four vertical sidewalls 2, 3, 4 and 5 are erected on the base plate 1 and form the outer housing of the fireplace. The sidewalls 2, 3, 4 and 5 are shaped so that they interlock. The two oppositely positioned sidewalls 3, 5 have the shape of a T and the other two oppositely positioned sidewalls 2, 4 have the shape of an inverted T, which can also be seen in FIGS. 2 and 3. FIG. 2 shows the fireplace from the side. FIG. 3 shows the fireplace from the top, with the chimney removed. The length of each of the arms of the letters T corresponds to the wall thickness of the sidewalls 2, 3, 4 and 5. The arms of the letters T of two adjacent sidewalls 2, 3, 4 and 5 where they fit together have oblique surfaces 6. Due to this shape of the sidewalls 2 3, 4 and 5 it is possible to assemble them without special connecting devices.

A firebox is positioned in the lower part of the housing and can be provided with fuel via the fireplace opening 7. Above all, cost-efficient soft wood types are used as fuel. A baking chamber is positioned directly above the firebox. This baking chamber is delimited by a metal wall and comprises a cylindrical metal barrel 8, indicated by dashed lines in FIG. 1. The metal barrel 8 is maintained in a suitable opening of the sidewall 3 with the interposition of a heat-resistant seal, not shown in the drawings. Two bolts, not shown in detail, are inserted in the oppositely positioned sidewall 5, on which the metal barrel 8 is supported. The bolts are seated with play in suitable through-bores in the concrete plate of the sidewall which is located opposite the sidewall having the opening. By means the play, stress cracking because of differences in heat expansion is prevented. Flue conduits are left between the metal wall of the metal barrel 8 and the sidewalls 2 and 4 of the housing. The end of the metal barrel 8 facing the sidewall 3 can be closed off by a door 9, which is accessible from the outside. The door 9 can be opened downward about the hinge 10. A horizontal inserted sheet metal piece 11 is positioned in the metal barrel 8 behind the door 9 and is intended to receive goods for baking. The baking chamber is also equipped with a thermometer 12.

FIG. 3 shows the housing of the multi-purpose fireplace from the top. As shown there, horizontal crossbars 13 are positioned between the upper end areas of the sidewalls 2 and 4. These crossbars 13 are positioned above the baking chamber and are intended for receiving at least one grilling grate and/or roasting and/or cooking utensils. Eight fire-resistant cover plates 14 can be placed on these crossbars 13 if it is intended to prepare food only at the places left open for the flue conduit. A pyramid-shaped chimney 15 is positioned on top of the housing. The chimney 15 is made of sheet metal and hingedly on the housing via with the hinge 16. As shown in FIG. 2, the chimney 15 can be flipped open if it is intended to grill, roast or cook. It can be closed if the intent is only to bake or to braise something under the chimney 15.

It is also possible to positioned the chimney 15 fixedly on the housing and to make it accessible only by an outer surface of the pyramid which can be flipped open.

The sidewalls 2, 3, 4, and 5 of the housing and the base plate 1 can be constructed of high-density concrete. The housing is sheathed on the sidewalls 2, 3, 4, and 5 and also on the base plate 1 with concrete plates, not shown in the drawings.

I claim:

1. In a multi-purpose fireplace for outdoor use having a firebox, a baking chamber and, above the baking chamber, at least one grill, the improvement comprising: an outer housing forming said firebox, a metal wall having a door (9) accessible from outside of the multi-purpose fireplace forming said baking chamber, said baking chamber disposed within said outer housing above said firebox, said metal wall and said outer housing forming at least one open flue conduit between said metal wall and said outer housing directly above a hearth, said outer housing comprising at least four interlocking sidewalls (2, 3, 4, 5), two opposed said sidewalls (3, 5) of said outer housing shaped as a T and the two other opposed said sidewalls (2, 4) shaped as an inverted T, two arms of each said T-shaped sidewall (2, 3, 4, 5) each having a length corresponding to a wall thickness, and at least one oblique surface (6) of each said sidewall (2, 3, 4, 5) interlocking to maintain said sidewalls (2, 3, 4, 5) together.

2. In a multi-purpose fireplace in accordance with claim 1, wherein a plurality of horizontal crossbars (13) are disposed within said outer housing above the baking chamber for at least one of grilling, roasting and cooking purposes, and at least one cover plate (14) covers said horizontal crossbars (13), leaving open at least one of said flue conduits.

3. In a multi-purpose fireplace in accordance with claim 2, wherein a plurality of removable and fire-resistant said cover plates (14) are disposed on said horizontal crossbars (13) extending along two oppositely positioned sidewalls (2, 4) of said outer housing, leaving open at least one of said flue conduits.

4. In a multi-purpose fireplace in accordance with claim 3, wherein said outer housing is disposed on a base plate (1).

5. In a multi-purpose fireplace in accordance with claim 3, wherein a chimney (15) shaped as a truncated pyramid is disposed above said outer housing, said chimney (15) secured to said outer housing by a hinge (16).

6. In a multi-purpose fireplace in accordance with claim 5, wherein said outer housing is constructed of concrete plates.

7. In a multi-purpose fireplace in accordance with claim 6, wherein said outer housing is sheathed around said hearth with concrete plates of limited fire resistance which transfer heat.

8. In a multi-purpose fireplace in accordance with claim 1, wherein said metal wall is a cylindrical metal barrel (8) fastened to an inner surface of at least one of said sidewalls (2, 3, 4, 5) of said outer housing and closable from said outside by said door (9).

9. In a multi-purpose fireplace in accordance with claim 8, wherein the baking chamber is seated interchangeably in an opening corresponding to a diameter of said metal barrel (8) and rests at the oppositely positioned said sidewall on inserted bolts which are seated with play in through-bores within the oppositely positioned said sidewall.

10. In a multi-purpose fireplace in accordance with claim 1, wherein said outer housing is disposed on a base plate (1).

11. In a multi-purpose fireplace in accordance with claim 1, wherein a chimney (15) shaped as a truncated pyramid is disposed above said outer housing, said chimney (15) secured to said outer housing by a hinge (16).

12. In a multi-purpose fireplace in accordance with claim 1, wherein said outer housing is constructed of concrete plates.

13. In a multi-purpose fireplace in accordance with claim 1, wherein said outer housing is sheathed around said hearth with concrete plates of limited fire resistance which transfer heat.

* * * * *